June 26, 1956     T. C. RUSH     2,752,057
MOBILE GIN POLE HAY STACKER
Filed Oct. 29, 1953     6 Sheets-Sheet 1

Thomas C. Rush
INVENTOR.

June 26, 1956 — T. C. RUSH — 2,752,057
MOBILE GIN POLE HAY STACKER
Filed Oct. 29, 1953 — 6 Sheets-Sheet 3

Thomas C. Rush
INVENTOR.

June 26, 1956  T. C. RUSH  2,752,057
MOBILE GIN POLE HAY STACKER
Filed Oct. 29, 1953  6 Sheets-Sheet 4

Thomas C. Rush
INVENTOR.

June 26, 1956  T. C. RUSH  2,752,057
MOBILE GIN POLE HAY STACKER
Filed Oct. 29, 1953  6 Sheets-Sheet 5

Thomas C. Rush
INVENTOR.

June 26, 1956  T. C. RUSH  2,752,057
MOBILE GIN POLE HAY STACKER

Filed Oct. 29, 1953  6 Sheets-Sheet 6

Thomas C. Rush
INVENTOR.

BY *Clarence A. O'Brien*
*and Harvey B. Jackson*
Attorneys

United States Patent Office 2,752,057
Patented June 26, 1956

2,752,057
MOBILE GIN POLE HAY STACKER

Thomas C. Rush, Mansfield, Mo.

Application October 29, 1953, Serial No. 388,962

14 Claims. (Cl. 214—701)

The present invention relates to means for stacking hay and more particularly relates to a mobile hay stacker wherein the hay lifting fork is mounted for raising and lowering on a gin pole or similar member. This invention is an improvement of the invention disclosed in my copending application, Serial No. 283,795 entitled Gin Pole Hay Stacker, filed on April 23, 1952, now Patent No. 2,705,572.

The primary object of the present invention is to provide a gin pole hay stacker utilizing a novel type of pole construction and carriage arrangement for raising and lowering the hay fork which greatly reduces the bulk of the carriage over carriages presently utilized for this purpose, and which considerably simplifies the fork carriage along with the means mounting the carriage on the gin pole for movement thereon.

Another object of the invention, ancillary to the primary object, is the provision of a gin pole mounted carriage for moving the hay fork along the gin pole in which all the moving parts of the carriage contacting the gin pole are disposed within the gin pole and which provides a continually smooth rolling action having a minimum of frictional engagement between the carriage and the gin pole.

Another extremely important object of the invention is the provision of a novel arrangement for retaining the hay fork against sway while being elevated and an improved means for dumping the fork.

A still further object of the invention, ancillary to the preceding object, is the provision of a novel sway preventing means and fork dumping means which is operatively connected with and simultaneously operable with the means raising and lowering the carriage on the gin pole.

Yet another object of the invention is the provision of a novel and extremely effective means for holding the tines of the fork against the ground as the mobile unit is moved therealong to pick up the hay bales.

A final object of the invention to be mentioned specifically is the provision of a mobile gin pole hay stacker having an improved bracing arrangement for the gin pole.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In view of the nature of the invention, it is believed that a more ready understanding of the operation and construction will be obtained by first setting forth the general construction and operation of the device and then individually setting forth the specific parts of the structure which aid in its operation.

*General construction and operation*

Figures 1, 2:
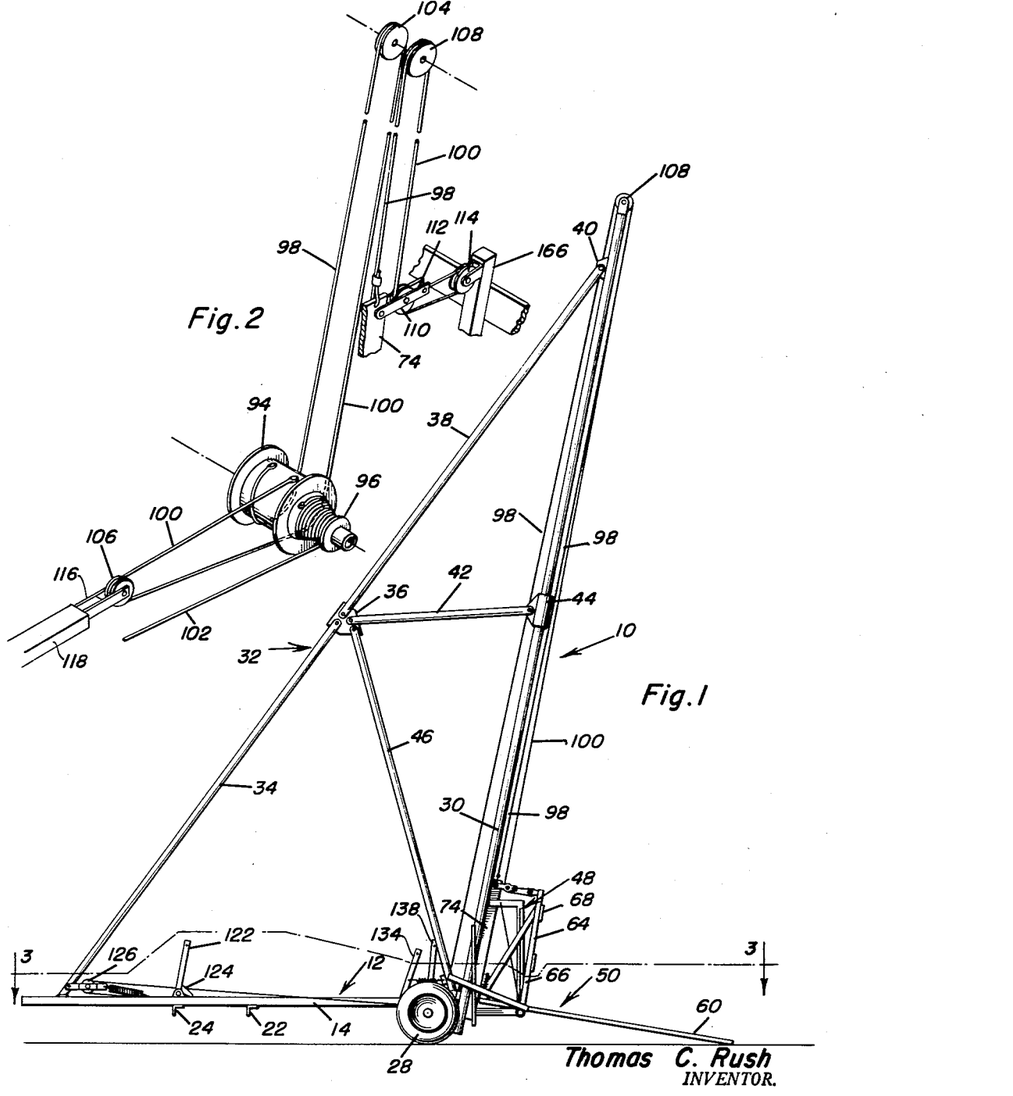
Figure 1 is a side elevational view of the mobile gin pole hay stacker with the hay fork being shown in down position with the tines being forced into engagement with the ground at their outer ends.
Figure 2 is an enlarged detail view of a portion of the means for lifting the carriage upwardly on the gin pole and the means for dumping the hay fork with certain parts being omitted for clarity of detail.
Figure 3:
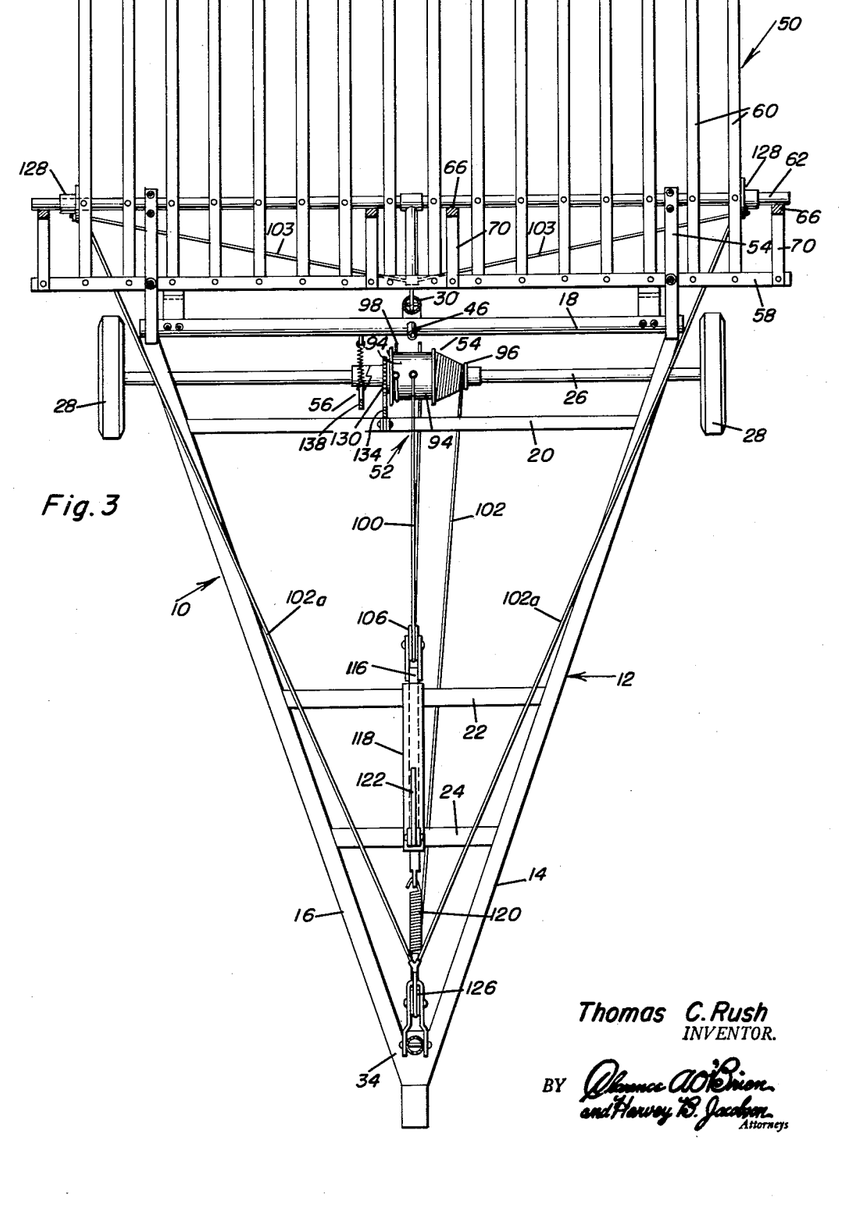
Figure 3 is a top elevational view of the gin pole hay stacker taken substantially along section line 3—3 of Figure 1.

Referring most particularly to Figures 1 and 3 wherein the general construction and operation of the device may be most readily observed, the mobile gin pole hay stacker is designated in its entirety by the numeral 10. The hay stacker 10 consists essentially of a suitable horizontal frame 12 being constructed in the embodiment shown in the shape of an A-frame having a pair of side frame members 16 and 14 diverging from one another from the rear to the forward end of the frame. At the forward end of the frame, the ends of the side frame members are connected by a front cross-member 18. At longitudinally spaced intervals on the frame 12, additional cross-braces 20, 22 and 24 are provided. An axle 26 is suitably journaled to the underside of the side frame members 14 and 16 adjacent the forward ends thereof, and supporting wheels 28 are mounted at the ends of the axle to rollingly support the frame.

Mounted at the front of the frame 12 centrally of the front cross-member 18 is an upwardly extending gin pole 30. To rigidly support the gin pole 30 against forward and rearward swinging movement relative to the frame 12, a rigid bracing assembly 32 is provided. Essentially, the bracing assembly 32 consists of an upwardly extending rigid brace member 34 secured at its lower end to the rear end of the frame 12 at the juncture of the side frame members 14 and 16 to one another, and secured at its upper end to a connector plate 36 which is disposed about midway between the ends of the gin pole 30. A second rigid brace 38 in alignment with the brace 34 is secured at its lower end to the connector plate 36 and at its upper end, it is pivotally secured to a lug 40 secured to the rear of the gin pole adjacent the upper end thereof.

In view of the extremely long length of the extended brace consisting of members 34 and 38, additional rigid bracing is provided for the gin pole in the form of a substantially horizontally disposed and forwardly extending rigid brace 42 secured at its rearward end to the connector plate 36 and at its forward end to a collar 44 clamped to the gin pole intermediate the ends of the gin pole. In this connection, for reasons that will appear later, it is to be noted that the collar 44 is in the form of a split ring to permit passage of the carriage along the gin pole. A diagonal brace 46 is secured at its upper end to the connector plate 36 and at its lower end to the central portion of the forward cross-member 18 of the frame. This arrangement provides ample rigidity against forward and rearward movement of the gin pole 30. Mounted on the gin pole 30 for raising and lowering movement thereon is a carriage 48 which carries a hay fork 50.

Driving means 52 in the form of cable winding drums 54 is rotatably journaled on the axle 26 and may be clutched thereto by means of the clutch 56 to raise and lower the carriage 48 and consequently the hay fork 50 in a manner to be subsequently described.

For purposes of general description, the operation is as follows:

As the hay fork is disposed in the position shown in Figure 1, the forward movement of the stacker 10 will guide hay bales onto the lifting fork 50. When it is desired to lift the fork, the drum means 54 is clutched to the axle 26 by means of the clutch 56 and the hay fork 50 is first raised to a level position, and then the carriage 48 is moved upwardly along the gin pole 30. When the hay fork 50 has been raised a sufficient amount, the hay fork 50 is tilted to a dumping position whereby the bales fall therefrom. Then, by disengaging the clutch 56, the carriage 48 carries the hay fork 50 back to its ground engaging position wherein it is automatically tilted forwardly in the position shown in Figure 1 to again guide hay bales thereonto. In this connection, the clutch 56 may be utilized as a brake in controlling the downward movement of the carriage 48.

The hay fork itself comprises a transversely extending rear cross-member 58 having the rear ends of a plurality of forwardly projecting tines 60 secured in longitudinally spaced relation therealong. An intermediate transverse member 62 is secured to the tines 60 forwardly of the rear transverse member 58.

A back wall 64 is formed on the fork from a plurality of members 66 rising perpendicularly from the intermediate transverse member 62 and interconnected to one another by means of cross-members 68. Suitable braces 70 interconnect the perpendicular members 66 with the rear transverse member 58.

Carriage

Referring now to Figures 6–8 and Figure 4, the construction of the gin pole and carriage and the connection of the carriage to the gin pole and the hay fork may be most readily observed.

Figure 6:
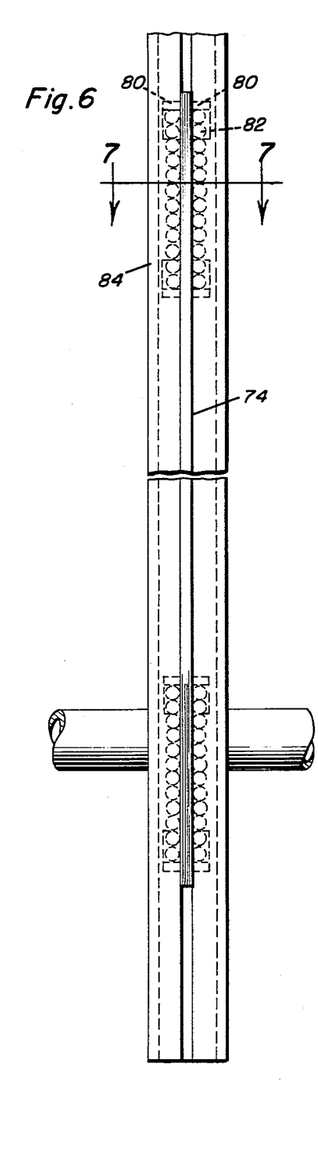
Figure 6 is an enlarged front view of a portion of the gin pole disclosing the mounting of the carriage therein.
Figure 7:
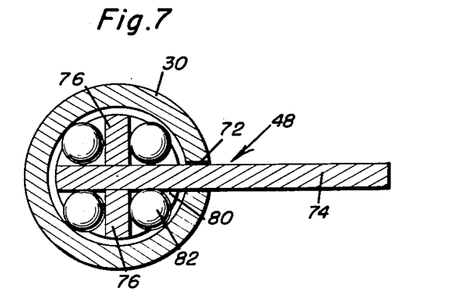
Figure 7 is a cross-sectional view of the gin pole and carriage taken substantially along section line 7—7 of Figure 6.
Figure 8:
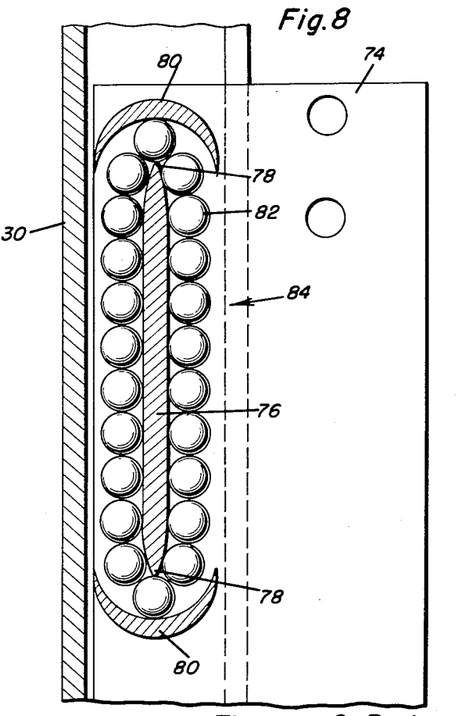
Figure 8 is a longitudinal view of the gin pole with a portion thereof being shown in section to disclose the mounting of the bearings of the carriage within the gin pole.

Referring first to Figures 6–8, the construction of the carriage 48 and its mounting on the gin pole 30 will first be described.

As shown in these figures, the gin pole 30 is in the shape of an elongated, split tube having slot 72 extending throughout the length thereof and opening into the interior thereof. The carriage 48 includes an elongated, rigid, flat plate 74 of slightly less thickness than the width of the slot 72 so that the same may be projected outwardly through the slot 72. As appears most clearly in Figures 7 and 8, the elongated plate 74 is disposed with the rearward portion thereof throughout its length disposed within the interior of the tubular member 30 and its forward portion projecting through the slot 72 exteriorly of the gin pole 30.

Projecting from opposite surfaces of the portion of the plate 74 disposed within the gin pole 30 at longitudinally spaced intervals along the plate 74 are cross-members 76. The cross-members 76 are so spaced within the gin pole 30 so as to divide the interior of the gin pole into quadrants. The upper and lower ends of the cross-members or longitudinally extending cross-plates 76 are arcuately tapered, as at 78, and semi-cylindrical caps 80 are welded to the opposite surfaces of the plate 74 overlying and underlying the upper and lower ends, respectively, of the cross-plates 76 in spaced relation thereto. Ball bearings 82 are disposed in the bearing guides thus formed by the cross-plates 76, caps 80 and the inner side wall surface of the gin pole 30. In effect, the space bounded by each cross-sectional quadrant formed within the gin pole 30 constitutes a bearing housing and each set of cross-plates 76 and caps 80 at longitudinally spaced intervals along the plate 74 constitutes a bearing race designated in its entirety by the numeral 84. The bearings 82 mounted within these races constitute extremely effective roller means for permitting the movement of the carriage plate 74 within and along the gin pole 30 with a minimum of friction. The cross-plates 76 serve admirably as roller plates, and the caps 80 constitute bearing guides for the bearings 82. During the movement of the carriage, the weight of the hay fork 50 and carriage 48 will roll on the forward bearings, in other words, those bearings 82 in the forward two quadrants formed within the gin pole, thereby forcing the bearings to the rear of the gin pole into position with the rear bearings moving loose and carrying no weight to permit a continual rolling movement of the bearings during the movement of the carriage within the gin pole around the roller guides 76.

With this arrangement, the carriage may be made exceedingly compact, since it needs no structure to surround and ride upon the exterior surfaces of the gin pole. Further, the rolling action is complete with all stresses on the carriage and the fork, since no matter what the degree of twist on the carriage or fork, the bearing surface is always engaged and no other.

To mount the hay fork 50 on the carriage, the forward edge of the plate 74 is provided with forwardly projecting, upper and lower arms 86 and 88, respectively. The outer ends of these arms are connected to one another by means of the connecting bar 90 which rigidifies the arms. The juncture of the lower arm 88 and the connecting member 90 is formed to provide a transverse socket 92 which may be in the form of a split ring or a one-piece collar. The intermediate transverse member 62 of the hay fork 50 is in the form of a tubular member which rotatably seats at its central portion in the socket 92 to secure the tine portion of the hay fork to the lower arm 88 of the carriage 48. As thus described, the hay fork 50 is permitted to swing about the carraige 48 by virtue of the rotatable journaling of the intermediate transverse member 62 of the fork in the socket 92 of the carriage.

Figure 4:
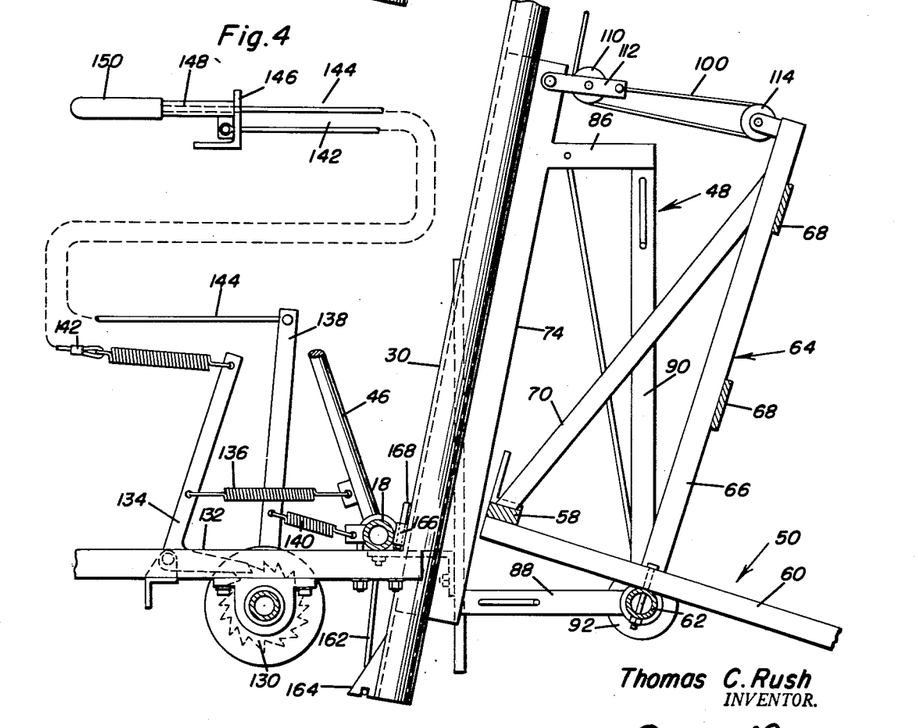
Figure 4 is an enlarged side elevational view of the portion of the hay stacker adjacent the connection of the gin pole to the stacker frame showing the connection of the operating means for lifting and dumping the hay stacker from a position remote from the hay stacker frame.

Lifting, dumping and sway preventing means for moving the hay fork along the gin pole Referring now most particularly to Figures 1, 2 and 4, the means for controlling the operation of the hay fork during its movement along the gin pole will now be described.

As was noted in the general outline of the construction and operation of the device, drum means 54 is journaled on the axle 26 and may be clutched thereto by means of the clutch 56.

The drum means 54 in reality comprises a cylindrical drum 94 and the cone drum 96 rigidly connected to one another in end-to-end relation so that they act as a single drum.

Secured to the cylindrical drum 94 are two cables, a lifting cable 98 and a fork tilting cable or dumping cable 100. These cables are wound upon the drum in a direction opposite the direction of the forward rotation of the wheels 28, and consequently the axle 26.

On the conical drum 96 a third cable 102 is mounted which comprises the sway control cable for the hay fork 50. This cable is wound upon the conical drum 96 in the direction of rotation of the wheels 28 so that as the cables 100 and 98 are wound upon the drum, the cable 102 is payed out.

For a more complete understanding of the operation of these cables, each will be described separately with respect to its function. Referring to Figure 2, the operation of the lifting cable 98 can be most readily observed, this cable being grounded at one end, or secured at one end, to the drum 94 and extending upwardly over a sheave 104 at the top of the gin pole 30, and thence downwardly to a connection at its other end to the upper end of the carriage plate 74. With this arrangement, it is obvious that as the drum 94 is rotated from the forward movement of the wheels 28, the cable 98 is wound upon the drum 94 and the carriage 48 and the hay fork 50 lifted upwardly on the gin pole 30.

The tilting cable 100 for tilting the hay fork 50 from its lifting position to its dumping position, however, does not wind around the drum 94, but instead, projects rearwardly from the drum over a sheave 106 and thence returns underneath the drum and extends upwardly over a sheave 108 on the top of the gin pole 30, thence downwardly to a sheave 110 mounted on suitable brackets 112 on the upper portion of the carriage plate 70, around the sheave 114 mounted on one of the perpendicular members 66 of the back wall 64 of the hay fork, and thence to securement on the bracket 112.

The sheave 106 is mounted on an elongated rod 116 which is in turn slidably disposed within a sleeve 118 secured to the cross-members 22 and 24 of the frame 12. The rear end of the rod 116 is secured to one end of a compression spring 120, which spring has its other end suitably secured to the rear end of the frame 12.

With this arrangement, when the tines 60 are in their downwardly tilted or ground engaging position, as shown in Figure 1, the cable 100 is slack, the spring 120 pulling the pulley 106 adjacent the sleeve 118 and locking the rod 116 in the sleeve in the manner described below. To create the slack in cable 100, the drum 94 is backed off, allowing the pulley 106 to move away from the drum 94 in response to the urging of spring 120 and unreel the cable 100 therefrom. This motion pulls the rod 116 rearwardly through the sleeve 118 and when the rearmost position is reached, lever 122 on sleeve 118 has a suitable locking pin 124 engaging the rod to lock the same in this position. This motion of the drum 94 also creates considerable slack in the load or lift cable 98. Thus, as the drum 94 is wound to lift the fork, as the cable 98 is tightened by the winding prior to exerting a lifting action, the cable 100 is tightened drawing the sheave 114 toward the sheave 110 and bringing the fork 50 to a level or lifting position. Thus, upon subsequent winding of the lifting cable 98 upon the drum 94, the cable 100 will simply wind on the drum to retain the fork 50 in lifting position.

When it is desired to dump the fork 50, the lever 122 is simply rocked out of engagement with the forward portion of the rod 116, allowing the rod to slide through the sleeve 118 in opposition to the spring 120 through the weight of the fork 50 and thereby allowing the sheave 114 to move away from the sheave 110 to tilt the fork 50 to its dumping position.

The stabilizing cable 102 wound upon the cone drum 96 in a direction opposite to the winding of the cables 98 and 100, like the cable 100, initially stretches rearwardly along the frame 12 and is entrained around the sheave 126 at the rear of the frame 12 from which it projects forwardly as a pair of cables, designated by the numeral 102a substantially paralleling the side frame members 14 and 16 and the frame 12. These cables 102a extend forwardly of the frame 12 to suitable bearing brackets 128 journaled at the ends of the intermediate transverse fork member 62 from whence they extend to a terminal on the lower arm 88 of the carriage 48. Initially, as the drums 94 and 96 are wound to lift the fork 50, the cable 102 and its connected cables 102a are payed out due to the opposite winding of the parent cable 102 on the drum 86 so that the same tenseness on this cable will be maintained at all times. Of course, as the lift fork 50 is moved downwardly on the gin pole 30, the cables 102 and 102a are moved inwardly with the cable 102 being again wound upon the drum 96 to retain a constant tension thereon to control the side sway or swing of the fork 50.

The drum 94 adjacent the clutch face of the drum is provided with a ratchet 130 and dog 132 mounted on lever 134 which is in turn mounted on the cross-member 20 of the frame 12 engages the ratchet 130. The ratchet 130 is so formed that it will permit free movement against the dog 132 as the lifting cable 98 is wound upon the drum. However, when the clutch 56 is disengaged, spring 136 connecting the dog lever 134 to the gin pole brace member 46 pulls the dog 132 into engagement with the teeth of the ratchet to prevent movement of the drum 94.

The clutch 56 is likewise provided with an upstanding lever 138 which continually biases the clutch 56 to engaging position by means of the spring 140 interconnecting this lever with the forward transverse member 18 of the frame 12.

To operate the clutch lever 138 and the dog lever 134 from a remote position, for example, on a tractor drawing the hay stacker, suitable cables 142 and 144, respectively, are secured to the upper ends of the levers 134 and 138 and thence extend through a suitable bracket 146 at a position remote from the levers. The cable 144 projects through the bracket 146, through a sleeve 148 and terminates in an enlarged handle 150 which abuts the outer end of the sleeve 148. The cable 142 likewise extends through the bracket 146 but is itself connected directly to the sleeve 148 and does not slidably extend therethrough, as does the cable 144.

With this arrangement, when it is desired to operate the clutch 56 and disengage the same without disengaging the dog 132, it is necessary only to pull on the handle 150 without disturbing the sleeve 148. When it is desired to operate both the clutch and the dog to disengage these members, it is only necessary to pull the sleeve 148 which will move both cables simultaneously and consequently both levers 134 and 138 simultaneously.

*Means for retaining the tines 60 in ground engaging position*

When the hay fork 50 is in its lowermost position, suitable means is provided to retain the tines 60 in their downwardly tilted position to enable them to pick up the hay bales and the like. For a clear understanding of this means, attention is directed to Figure 5 taken in conjunction with Figure 3.

Figure 5:
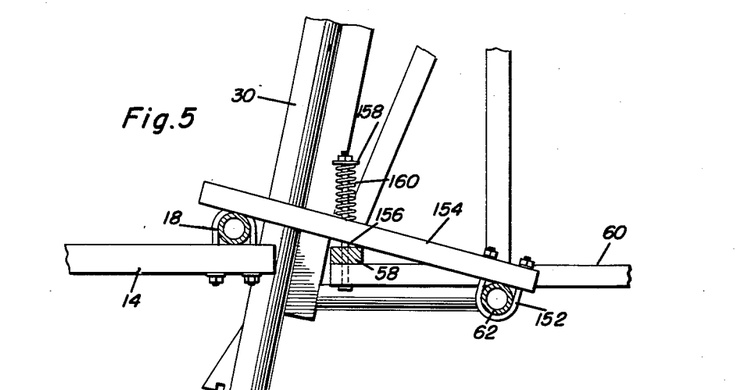
Figure 5 is an enlarged detail view disclosing the means for forcing the tines of the fork into ground engagement when the fork is at its lowermost position on the gin pole.

Noting first Figure 3, adjacent opposite sides of the fork 50 and rigidly secured by means of clamps 152 to the intermediate transverse member of the hay fork 50 are rearwardly extending bars 154 which project rearwardly a sufficient distance so that their rearward ends will overlie the forward transverse member 18 of the frame 12. Prongs 156 project upwardly through the rear transverse member 58 of the lift fork 50 through the member 154 and are capped at their upper ends, as at 158. Between the caps and the upper surfaces of the members 154, compression springs 160 are provided which continually exert pressure against the members 154. Thus, when the lift fork 50 is lowered to a position where the rear ends of the members 154 strike the transverse member 18, the natural tendency would be for the fork 50 to pivot about this point, this tendency being further enhanced by the continual pressure of the spring 160 on the members 154. This arrangement serves to admirably retain the outer ends of the tines 60 in engagement with the ground.

To support the lower end of the gin pole 30 on the frame 12, the frame is provided with a tie rod 162 at the forward end thereof extending parallel to and beneath the transverse member 18. The lower end of the gin pole 30 has a notched plate 164 which rests upon the central portion of the tie rod 162. To connnect the gin pole 30 to the transverse member 18, a tubular section or pipe 166 is welded to the central portion of the member 18 and a pin 168 is welded or otherwise secured to the rear surface of the gin pole 30 so that the pin 168 projects into the pipe 166 providing what amounts to a swivel joint at this point.

*Modified stabilizer assembly*

Figure 9:
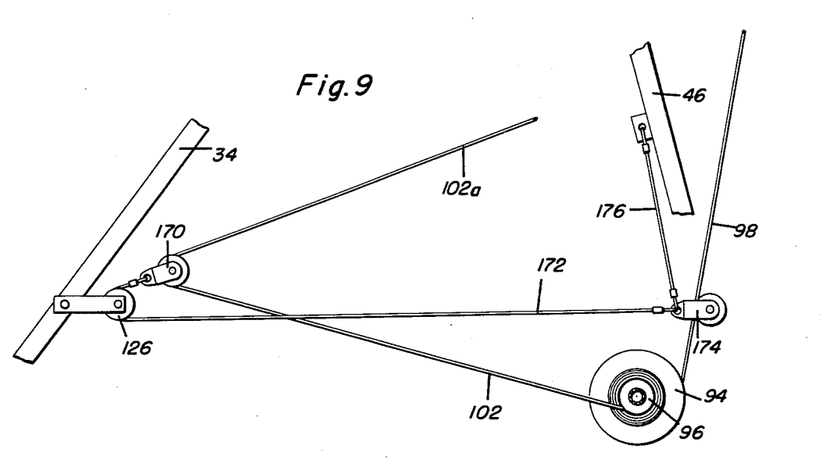
Figure 9 is a detail view of a modified sway stabilizer cable assembly when the hay fork is being raised.
Figure 10:
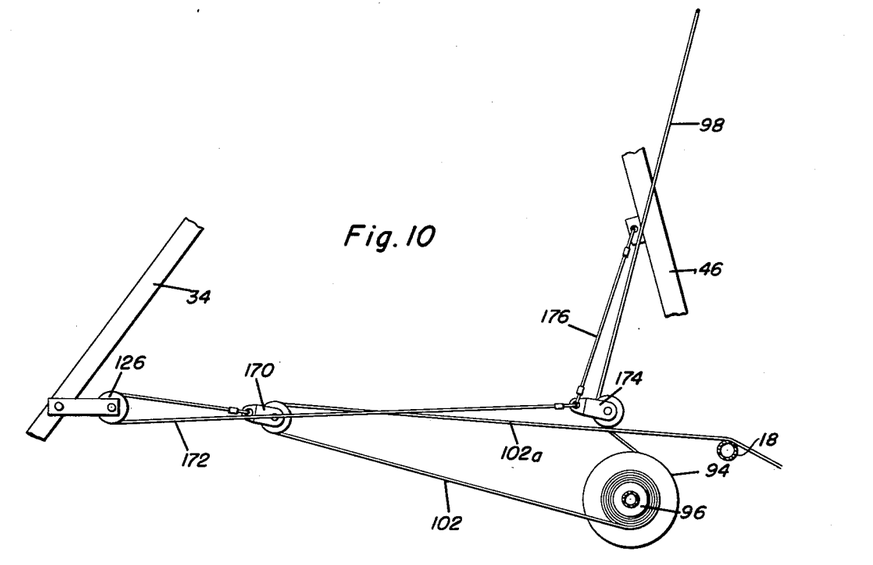
Figure 10 is a detail view of the assembly of Figure 9 when the hay fork is in ground engaging position.
Figures 11, 12:
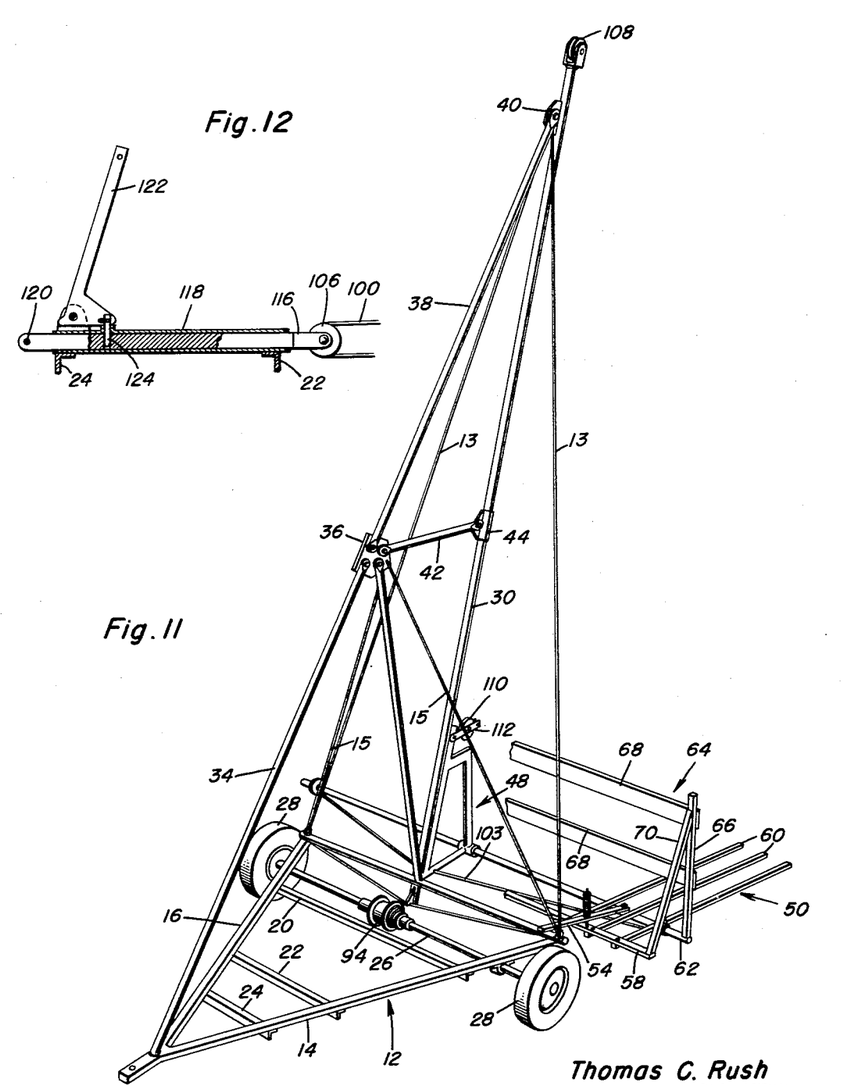
Figure 11 is a perspective view of the hay stacker with portions broken away and others omitted for clarity.
Figure 12 is an enlarged sectional view of a latch omitted from Figure 11.

In Figures 9 and 10 is shown a modified stabilizing cable assembly to provide slack on the stabilizing cables when the fork is in its ground engaging position to assure the movement of the dump rod 116 to its rearward latching position.

In this arrangement, cable 102 is wound on drum 96 and extends rearwardly from the drum 96 as described previously. However, the rearward end of the cable 102 is entrained over a traveling pulley 170. Secured to the free end of the cable 102 are the fork stabilizing cables 102a which extend to the bearing brackets 128 as previously described.

Entrained over the fixed sheave 126 is a control cable 172 having one end thereof attached to the traveling pulley 170. The other end of the control cable 172 extends forwardly to a point adjacent the lift cable 98 at which point it is attached to floating pulley 174 which rides along cable 98. Cable 176 suspended from an intermediate portion of diagonal brace 46 is also attached to the floating pulley 174 and acts in conjunction with the cable 172 to position the floating pulley.

The operation is as follows: In Figure 9, the stabilizing cable assembly is shown in the position it will assume as a load is applied to the lift or load cable 98 in lifting the hay fork 50 along the gin pole. During this movement, lift cable 98 is tensioned and floating pulley 174 is pulled forwardly toward the gin pole 30; this movement in turn is transmitted to the control cable 172 which pulls the traveling pulley 170 toward the fixed sheave 126 to tension the stabilizing cables 102a thereby stabilizing the hay fork 50 against wobbling movement on the gin pole.

When the hay fork 50 is in its down position, as shown in Figure 10, and the slack imparted to the lift cable 98 by backing off the drum 94, this movement is likewise transmitted to the control cable 172 and the traveling pulley 170 moves forwardly away from the fixed sheave 126 transmitting slack to the stabilizing cables 102a as the hay fork 50 assumes its ground engaging position. The lifting drum 94 may then be unwound further slacking line 100 permitting dump rod 116 to more easily move rearwardly into latching position by the action of spring 120.

Suitable guy wire bracing is of course provided where needed in the assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gin pole hay stacker comprising a wheeled supporting frame, a gin pole mounted on said frame, a carriage movably carried on said gin pole, a hay fork carried by said carriage, lifting means for moving said fork, tilting means for automatically tilting said fork to and resiliently maintaining said fork in a tilted ground engaging position when it is lowered on the gin pole, and dumping and leveling means for moving said fork from said ground engaging to a lifting position, and for moving said fork from a lifting to a dumping position, and brace means for retaining said fork against side sway.

2. A gin pole hay stacker comprising a wheeled supporting frame, a gin pole mounted on said frame, a carriage movably carried on said gin pole, a hay fork carried by said carriage, lifting means for moving said fork, tilting means for automatically tilting said fork to and resiliently maintaining said fork in a tilted ground engaging position when it is lowered on the gin pole, and dumping and leveling means for moving said fork from said ground engaging to a lifting position, and for moving said fork from a lifting to a dumping position, and brace means for retaining said fork against side sway, said second means including members rigidly attached to said fork engaging said frame as the fork is lowered on the gin pole forcing the fork to swing about the carriage.

3. The combination of claim 2 wherein said tilting means includes resilient means reacting against said rigidly attached members and said fork biasing the fork to a downwardly tilted position as the members engage the frame.

4. A gin pole hay stacker comprising a wheeled supporting frame, a gin pole mounted on said frame, a carriage movably carried on said gin pole, a hay fork carried by said carriage, lifting means for moving said fork, tilting means for automatically tilting said fork to a ground engaging position when it is lowered on the gin pole, and dumping and leveling means for moving said fork from said ground engaging to a lifting position, and for moving said fork from a lifting to a dumping position, and brace means for retaining said fork against side sway in all positions thereof in response to actuation of said lifting and said dumping means, said lifting, dumping and brace means constituting cables wound upon a drum, power means for rotating said drum.

5. A gin pole hay stacker comprising a wheeled supporting frame, a gin pole mounted on said frame, a carriage movably carried on said gin pole, a hay fork carried by said carriage, lifting means for moving said fork, tilting means for automatically tilting said fork to a ground engaging position when it is lowered on the gin pole, and dumping and leveling means for moving said fork from said ground engaging to a lifting position, and for moving said fork from a lifting to a dumping position, and brace means for retaining said fork against side sway in all positions thereof in response to actuation of said lifting and said dumping means, said lifting, dumping and brace means constituting cables wound upon a drum, power means for rotating said drum, said brace cable being cable wound on said drum reversely to said lifting and dumping cables.

6. A gin pole hay stacker comprising a wheeled supporting frame, a gin pole mounted on said frame, a carriage movably carried on said gin pole, a hay fork carried by said carriage, lifting means for moving said fork, tilting means for automatically tilting said fork to a ground engaging position when it is lowered on the gin pole, and dumping and leveling means for moving said fork from said ground engaging to a lifting position, and for moving said fork from a lifting to a dumping position, and brace means for retaining said fork against side sway, said lifting, dumping and brace means constituting cables wound upon a drum, power means for rotating said drum, said dumping cable extending rearwardly from said drum and being connected to an extensible and retractable means on said frame, and thence traveling under said drum, and interconnecting said carriage and said fork, said fork being swingably carried by said carriage, resilient means urging said extensible and retractable means to a retracting position, and latch means locking the extensible means in a retracted position.

7. A mobile hay stacker comprising a supporting frame, an upwardly extending gin pole on said frame, a carriage, means mounting said carriage on said gin pole for movement therealong, a hay fork mounted on said carriage, said gin pole comprising a tubular member having a longitudinal slot opening thereinto, a portion of said carriage being disposed within said gin pole, said mounting means including bearing members rollingly supporting said portion of said carriage within said gin pole, said carriage comprising an elongated plate, bearing supports on said plate, said bearing members being guidingly retained on said supports within said gin pole.

8. A mobile hay stacker comprising a supporting frame, an upwardly extending gin pole mounted on said frame, a carriage, means rollingly supporting said carriage on said gin pole, a lift fork pivotally mounted on said carriage, lifting and dumping means on said frame connected to said carriage and said lift fork, power means for operating said lifting and dumping means, said dumping means including a cable wound on a drum and connected to said carriage and said fork for moving the fork between a lifting position and a dumping position, and brace means operably connected to said lifting means for preventing side sway of said fork on said gin pole, said brace means including a cable wound on said drum reversely of said dumping cable, said brace cable extending rearwardly on said frame, then diverging into two forwardly extending cables attached to the side edge portions of said lift fork.

9. A mobile hay stacker comprising a supporting frame, an upwardly extending gin pole mounted on said frame, a carriage, means rollingly supporting said carriage on said gin pole for longitudinal movement therealong, a lift fork pivotally mounted on said carriage, lifting and dumping means on said frame connected to said carriage and said lift fork, power means for operating said lifting and dumping means, said dumping means including a cable wound on a drum and connected to said carriage and said fork for moving the fork between a lifting position and a dumping position, and brace means operably connected to said lifting means for preventing side sway of said fork on said gin pole, said brace means including a cable wound on said drum reversely of said dumping cable, said brace cable extending rearwardly on said frame, then diverging into two forwardly extending cables attached to the side edge portions of said lift fork, said brace cable being operatively connected to said lifting means whereby slack imparted to the lifting means is simultaneously imparted to the dumping means.

10. A mobile hay stacker comprising a supporting frame, an upwardly extending gin pole mounted on said frame, a carriage, means rollingly supporting said carriage on said gin pole for longitudinal movement therealong, a lift fork pivotally mounted on said carriage, lifting and dumping means on said frame connected to said carriage and said lift fork, power means for operating said lifting and dumping means, said dumping means including a cable wound on a drum and connected to said carriage and said fork for moving the fork between a lifting position and a dumping position, and brace means operably connected to said lifting means for preventing side sway of said fork on said gin pole, said brace means including a cable wound on said drum reversely of said dumping cable, said brace cable extending rearwardly on said frame, then diverging into two forwardly extending cables attached to the side edge portions of said lift fork, said brace cable being operatively connected to said lifting means whereby slack imparted to the lifting means is simultaneously imparted to the brace cable, the portion of said drum on which said brace cable is wound being conical and being tapered at a degree causing slack in the brace cable when the lift fork is in ground engaging position.

11. In a mobile hay stacker comprising a lift fork movable along a gin pole from a ground engaging position to lifting and dumping positions, means for lifting said lift fork on the gin pole from a ground engaging position to a lifting position, and sway prevention means attached to said lift fork and operatively connected to said lifting means, a cable winding drum on the hay stacker, said lifting means including a cable wound on said drum and connected to said lift fork, said sway prevention means including a cable wound on said drum reversely of said lifting cable, the sway cable being entrained over a traveling pulley and branching out into two diverging cables connected to the lift fork, a floating pulley riding on said lift cable, a connecting cable extending from said floating pulley, being entrained over a fixed pulley and connected to said traveling pulley, whereby slack on said lift cable is transmitted through said floating pulley to said sway cable.

12. In a mobile hay stacker comprising a supporting frame, an upwardly extending tubular gin pole, a carriage, said gin pole having a longitudinal slot opening thereinto substantially throughout the length thereof, said carriage being slidably guidingly disposed in said slot and having the rear portion thereof disposed within said gin pole, bearing supports on said rear portion, bearing members carried by said supports rollingly supporting said carriage on said gin pole by engagement with the inner wall of said pole.

13. In a mobile hay stacker including a frame having an upwardly extending gin pole thereon, a carriage movable along said pole and a hay fork pivotally carried by said carriage, a cable winding drum, a lifting cable wound on said drum and connected to said carriage for raising and lowering said carriage, a dumping cable wound on said drum and connected to said fork for dumping the same, a sheave means resiliently attaching said sheave to said frame urging the same away from said drum, means for releasably locking said sheave in positions selective distances away from said drum, said dumping cable being entrained over said sheave and dumping said fork upon release of said sheave from its locked position.

14. In a mobile hay stacker including a frame having an upwardly extending gin pole thereon, a carriage movable along said gin pole and a hay fork pivotally carried by said carriage, a cable winding drum, a lifting cable wound on said drum and connected to said carriage for moving the carriage along the gin pole, a conical end on said drum, sway prevention means comprising a cable wound on said conical end, a fixed pulley mounted on said frame, a floating pulley riding on said lifting cable, a cable having a traveling pulley at one end thereof being entrained over said fixed pulley and connecting said traveling pulley to the frame, said sway prevention cable being entrained over said traveling pulley and connected to said hay fork, tensioning of said lift cable moving said floating pulley and tensioning said sway prevention cable.

References Cited in the file of this patent
UNITED STATES PATENTS

| | | |
|---|---|---|
| 708,804 | Erbe | Sept. 9, 1902 |
| 786,513 | Orton | Apr. 4, 1905 |
| 916,050 | Steele | Mar. 23, 1909 |
| 1,860,222 | Billings | May 24, 1932 |
| 2,230,442 | Arms | Feb. 4, 1941 |
| 2,372,870 | Willrodt | Apr. 3, 1945 |
| 2,439,139 | Le Tourneau | Apr. 6, 1948 |
| 2,621,820 | O'Sullivan | Dec. 16, 1952 |